Nov. 6, 1923.

J. E. MACKAY 1,472,986

CUSHION TIRE

Filed Nov. 20, 1922

INVENTOR.
JOSEPH E. MACKAY.
BY
ATTORNEYS.

Patented Nov. 6, 1923.

1,472,986

UNITED STATES PATENT OFFICE.

JOSEPH E. MACKAY, OF SAN FRANCISCO, CALIFORNIA.

CUSHION TIRE.

Application filed November 20, 1922. Serial No. 602,170.

*To all whom it may concern:*

Be it known that I, JOSEPH E. MACKAY, a citizen of the United States, residing in the city and county of San Francisco and State of California, have invented new and useful Improvements in Cushion Tires, of which the following is a specification.

This invention relates to cushion tires for vehicles.

It is the principal object of the present invention to provide a generally improved vehicle tire which does not require the use of pneumatic cushions but which is possessed with all the desirable resilient qualities of a pneumatic tire.

The invention contemplates the use of a plurality of resilient blocks arranged around the peripheral surface of a wheel rim and encased by a tire casing; the blocks are arranged and designed so as to locally absorb minor road shocks and to substantially absorb all major shocks without imparting them to the vehicle wheel.

One form which the invention may assume is exemplified in the following description and illustrated by way of example in the accompanying drawings, in which.

Figure 1:
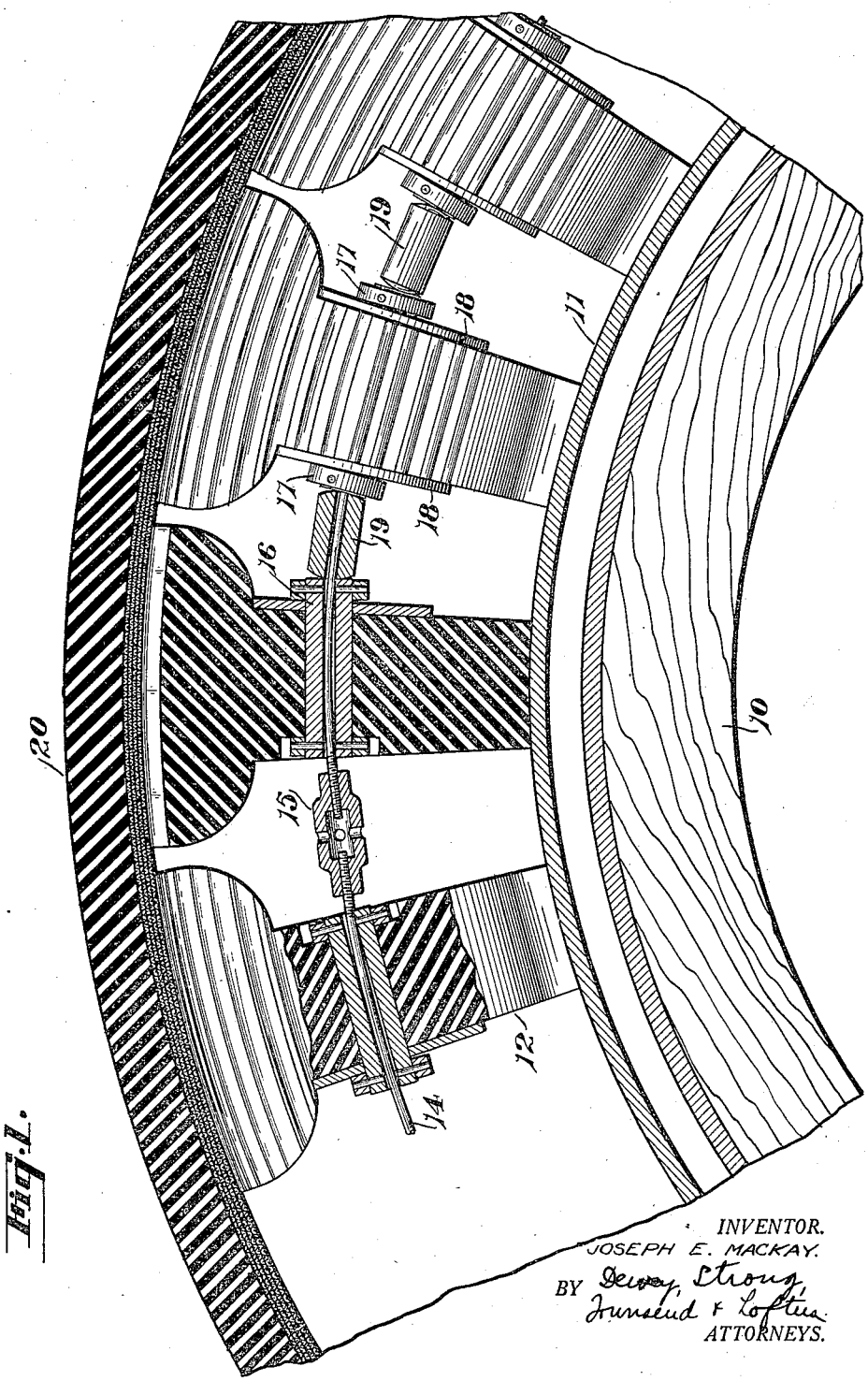
Fig. 1 is a fragmentary view in section, of a tire structure, embodying the preferred form of the invention.
Figure 2:
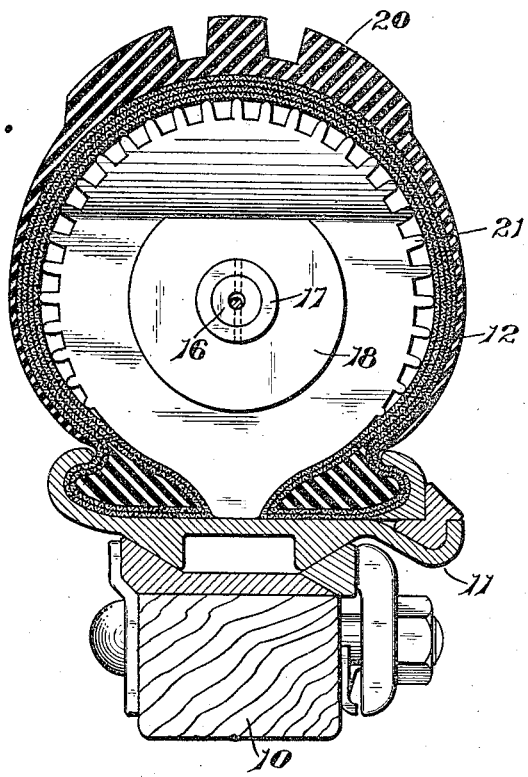
Fig. 2 is a sectional view of the tire casing disclosing one of the resilient blocks mounted therein.
Figure 3:
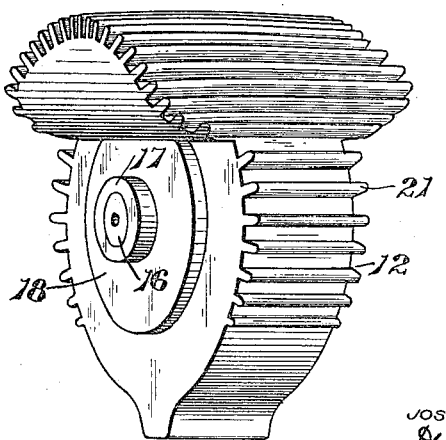
Fig. 3 is a perspective view of the preferred type of resilient blocks employed.

Referring more particularly to the accompanying drawings, 10 indicates a wheel felloe which is fitted with a demountable clincher rim 11. Arranged around the periphery of the rim, are a plurality of resilient blocks 12 which are spaced equal distances apart. These blocks are all connected together by a metal rod 14 which extends circumferentially of the tire approximately centrally through the resilient blocks. The ends of this, as shown in Fig. 1, are connected by a turn-buckle 15 so that any desired degree of tension may be applied to the rod to maintain the blocks in firm engagement with the rim. In this manner circumferential creeping of the blocks on the rim is obviated.

As shown in Fig. 1, each block is provided with a tubular bushing 16 through which the circumferential rod extends. The bushing is maintained in position by collars 17 which are secured thereto at its ends. Washers 18 of large diameter are interposed between the collars and the side surfaces of the resilient blocks for the purposes of supporting the blocks and maintaining them in an upright position when under compression. It is preferred that the bushings, collars and washers mentioned, be formed of fibre as this material is a non-conductor of heat, which is very detrimental to rubber or rubberized compositions. Fibre spacers 19 are provided and are carried by the rod 14 as shown, to maintain the resilient blocks the correct distance apart.

The resilient blocks are encased by a tire casing 20 which may be of any approved design. The one shown is provided with a fabric carcass, a rubber tread and conventional beads for clincher rims. Although the clincher type is shown, it is obvious that the straight side type will serve equally as well.

The blocks are all formed with radial longitudinally extending ribs 21, which, when the blocks are arranged in the casing, extend circumferentially of the tire. These ribs contact with the inner surface of the casing at the top and sides thereof and serve to absorb minor shocks and to prevent friction between the casing and the blocks. It can readily be seen that the ribs will not rub against the inner surface of the casing should the latter engage inequalities in the road, but will deflect therewith, thus eliminating friction and heating up of the blocks caused thereby.

The upper portion of the blocks is formed longer than the lower bearing portion thereof so as to give maximum support to the tread of the casing without detracting from the tire's resilient qualities.

In practicing the invention, the blocks are assembled in a tire casing as shown, with the turnbuckle connecting the ends of the rod 14. The casing is then mounted on the wheel and one bead forced in engagement with the rim. The turnbuckle 15 is then turned to draw together the ends of the rod 14 to clamp the resilient blocks into firm engagement with the peripheral surface of the rim. When this is accomplished, the other bead of the tire may be placed in engagement with the rim. The tire is then ready for operation.

From the foregoing it is obvious that a comparatively simple vehicle tire has been provided that possesses all of the desirable features of both a pneumatic and cushion tire without the undesirable qualities of either.

While I have shown the preferred form of my invention, it is understood that various changes in the construction and combination of the various parts employed may be made by those skilled in the art without departing from the spirit of the invention as claimed.

Having thus described my invention, what I claim and desire to secure by Letters Patent is:

1. In combination with the casing of a pneumatic tire, a plurality of cushion members of a shape to conform to the sectional contour of the casing, and adapted to be disposed within the casing, said casing members having widened outer portions combining to form a substantially continuous tread surface circumferentially of the tire, and narrower inner portions, and means for holding the members in spaced relation to each other.

2. In combination with the casing of a pneumatic tire, a plurality of cushion members of a shape to conform to the sectional contour of the casing, and adapted to be disposed within the casing, said cushion members having widened outer portions combining to form a substantially continuous tread surface circumferentially of the tire and narrower inner portions, means for holding the members in spaced relation to each other, and means for creating a tension on the series of cushion members by the holding means.

3. In combination with a tire rim, of a vehicle tire adapted to be mounted thereon, said tire comprising a casing, a plurality of circumferentially arranged blocks mounted in the casing, a connection between said blocks, the top and side surfaces of said blocks being formed with circumferentially extending ribs for engagement with the inner surface of the casing.

4. In combination with a tire rim, of a vehicle tire adapted to be mounted thereon, said tire comprising a casing, a plurality of circumferentially arranged cushion members mounted in the casing, said members being of a shape to conform to the sectional contour of the casing and having widened outer portions combining to form a substantially continuous tread surface circumferentially of the tire and narrow inner portions, the surfaces of said members engaging the inner surface of the casing being formed with circumferentially extending ribs.

5. In combination with a tire rim, of a vehicle tire adapted to be mounted thereon, said tire comprising an outer casing, a plurality of circumferentially arranged blocks mounted in the casing, an anti-friction surface on the blocks engaging the inner surface of the casing, whereby to obviate friction therebetween, and an adjustable connection between the blocks whereby they may be forced in firm engagement with the rim.

6. In combination with a tire rim, of a vehicle tire adapted to be mounted thereon, said tire comprising a casing, a plurality of circumferentially arranged resilient blocks mounted in the casing at spaced distances apart, a circular member passing through said blocks, means for decreasing the diameter of said member to force said blocks in firm engagement with the rim, and insulating means between said circular member and the blocks.

7. In combination with a tire rim, of a vehicle tire adapted to be mounted thereon, said tire comprising a casing, a plurality of circumferentially arranged resilient blocks mounted in the casing at spaced distances apart, a rod extending circumferentially through said blocks and connecting the same, means for adjusting the rod to force said blocks in firm engagement with the rim, and insulating means between said rod and the blocks.

JOSEPH E. MACKAY.